(12) United States Patent
Lipkin et al.

(10) Patent No.: US 10,494,926 B2
(45) Date of Patent: Dec. 3, 2019

(54) SYSTEM AND METHOD FOR MAINTAINING MACHINES

(71) Applicant: General Electric Company, Schenectady, NY (US)

(72) Inventors: Don Mark Lipkin, Niskayuna, NY (US); Todd William Danko, Niskayuna, NY (US); Edgar Carrasco, Muenchenstein (CH); Wolfgang Zesch, Windisch (CH); Thomas Edward Morris, Zurich (CH)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 15/688,366

(22) Filed: Aug. 28, 2017

(65) Prior Publication Data

US 2019/0063223 A1 Feb. 28, 2019

(51) Int. Cl.
*B23P 6/00* (2006.01)
*F01D 5/00* (2006.01)

(52) U.S. Cl.
CPC ............ *F01D 5/005* (2013.01); *B23P 6/002* (2013.01); *F05D 2230/80* (2013.01); *Y10T 29/49718* (2015.01)

(58) Field of Classification Search
CPC ...... F01D 5/005; F05D 2230/80; B23P 6/002; Y10T 29/49718
See application file for complete search history.

(56) References Cited

U.S. PATENT DOCUMENTS

| 5,155,941 A | 10/1992 | Takahashi et al. |
| 5,197,191 A | 3/1993 | Dunkman et al. |
| 5,254,413 A | 10/1993 | Maricocchi |
| 5,644,394 A * | 7/1997 | Owens .................... B23P 6/002 15/324 |
| 5,723,078 A | 3/1998 | Nagaraj et al. |
| 6,010,746 A * | 1/2000 | Descoteaux ......... B23K 20/002 427/142 |
| 6,235,352 B1 | 5/2001 | Leverant et al. |
| 6,413,578 B1 | 7/2002 | Stowell et al. |

(Continued)

FOREIGN PATENT DOCUMENTS

| EP | 1251191 A1 | 10/2002 |
| EP | 1304446 A1 | 4/2003 |

(Continued)

OTHER PUBLICATIONS

International Search Report and Written Opinion issued in connection with corresponding PCT Application No. PCT/US2018/42236 dated Oct. 31, 2018; 12 pp.

*Primary Examiner* — Bayan Salone
(74) *Attorney, Agent, or Firm* — Armstrong Teasdale LLP

(57) ABSTRACT

A system for use in maintaining a machine including a cavity is provided. The system includes a pilot apparatus including an insertion end and a steering end opposite the insertion end. The insertion end is positionable within the machine such that the pilot apparatus defines a path through the machine. The system also includes a steering interface configured to steer the insertion end relative to the machine. The system further includes a service apparatus for use in maintaining the machine. The service apparatus is configured to move along the path defined by the pilot apparatus.

20 Claims, 12 Drawing Sheets

(56) References Cited

U.S. PATENT DOCUMENTS

| | | | |
|---|---|---|---|
| 6,569,492 B2 | 5/2003 | Fernihough et al. | |
| 6,827,969 B1 | 12/2004 | Skoog et al. | |
| 6,919,121 B2 | 7/2005 | Stowell et al. | |
| 7,008,522 B2 | 3/2006 | Boucard et al. | |
| 7,032,279 B2 | 4/2006 | McCarvill et al. | |
| 7,309,512 B2 | 12/2007 | Srinivasan | |
| 7,387,814 B2 | 6/2008 | Fischer et al. | |
| 7,476,703 B2 | 1/2009 | Ruud et al. | |
| 7,509,735 B2 | 3/2009 | Philip et al. | |
| 7,544,520 B2 | 6/2009 | Duda et al. | |
| 8,039,773 B2 * | 10/2011 | Spallek | B23P 6/007 219/121.63 |
| 8,400,501 B2 * | 3/2013 | Heyworth | F01D 21/003 340/539.26 |
| 8,496,990 B2 | 7/2013 | Tuppen et al. | |
| 8,563,080 B2 * | 10/2013 | Hopkins | C23C 4/06 427/140 |
| 8,602,722 B2 * | 12/2013 | George | F01D 21/003 415/118 |
| 8,609,185 B2 | 12/2013 | Tuppen et al. | |
| 8,904,635 B2 | 12/2014 | Berkebile et al. | |
| 9,085,053 B2 | 7/2015 | Tholen et al. | |
| 9,403,244 B2 * | 8/2016 | Rautenberg | B23P 6/002 |
| 2002/0108644 A1 * | 8/2002 | Hoadley | F23J 3/023 134/172 |
| 2003/0221315 A1 | 12/2003 | Baumann et al. | |
| 2003/0229420 A1 | 12/2003 | Buckingham et al. | |
| 2004/0043160 A1 | 3/2004 | Fusaro et al. | |
| 2005/0067466 A1 | 3/2005 | Boegli et al. | |
| 2006/0042083 A1 | 3/2006 | Baker et al. | |
| 2007/0202269 A1 | 8/2007 | Potter et al. | |
| 2009/0094829 A1 | 4/2009 | Bunting et al. | |
| 2011/0059321 A1 | 3/2011 | Skoog et al. | |
| 2011/0206533 A1 | 8/2011 | Lee et al. | |
| 2013/0232792 A1 | 9/2013 | Quinones et al. | |
| 2014/0067185 A1 | 3/2014 | Tralshawala et al. | |
| 2014/0130583 A1 | 5/2014 | Kell et al. | |
| 2014/0193664 A1 | 7/2014 | Thompson et al. | |
| 2015/0040394 A1 * | 2/2015 | Spanos | B23P 6/002 29/889.1 |
| 2015/0092039 A1 | 4/2015 | Runge et al. | |
| 2015/0174837 A1 | 6/2015 | Kolvick et al. | |
| 2015/0174838 A1 | 6/2015 | Kittleson et al. | |
| 2015/0175486 A1 | 6/2015 | Roberts et al. | |
| 2015/0209915 A1 | 7/2015 | Rautenberg et al. | |
| 2017/0107859 A1 | 4/2017 | Clark et al. | |

FOREIGN PATENT DOCUMENTS

| | | |
|---|---|---|
| EP | 1881154 A1 | 1/2008 |
| EP | 1591549 B1 | 3/2010 |
| JP | S60-230113 A | 11/1985 |
| WO | 2005056877 A1 | 6/2005 |
| WO | 2007147387 A2 | 12/2007 |
| WO | 2016/076704 A1 | 5/2016 |

* cited by examiner

SYSTEM AND METHOD FOR MAINTAINING MACHINES

BACKGROUND

The field of the disclosure relates generally to a system and method for maintaining machines and, more particularly, to pilot apparatus for positioning service apparatus within machines.

At least some known machines, such as turbines for aircraft engines and gas and steam powered turbines for industrial applications, include an outer case and at least one rotor that carries multiple stages of rotating airfoils, i.e., blades, which rotate with respect to the outer case. In addition, the outer case carries multiple stages of stationary airfoils, i.e., guide vanes. The blades and guide vanes are arranged in alternating stages. In at least some known machines, shrouds are disposed on the radially inner surfaces of a stator to form a ring seal around tips of the blades. Together, the blades, guide vanes, and shrouds define a primary flowpath inside the compressor and turbine sections of the machine. This flowpath, combined with a flowpath through the combustor, defines a primary cavity within the machine.

During operation, the components of the machines experience degradation. Accordingly, for at least some known machines, periodic inspections, such as borescope inspections, are performed to assess the condition of the machines in-between service intervals. Examples of conditions observed during inspections include wear (e.g., from incursion of blade tips into the shrouds, particle-induced erosion, water droplet induced erosion, wear due to sliding contact between stationary components), impact (e.g., spallation of thermal barrier coating (TBC) or environmental barrier coating (EBC) from turbine-section components, leading edge burring/bending of compressor blades), cracking (e.g., thermal fatigue, low-cycle fatigue, high-cycle fatigue, creep rupture), edge-of-contact damage between stationary parts, oxidation or hot corrosion of high-temperature metallic sections, static seal degradation, and creep deformation (e.g., of guide vane sidewalls/airfoils, blade platforms, and blade tip shrouds).

During service intervals, the machines are at least partially disassembled to allow repair and/or replacement of damaged components. For example, damaged components of at least some known machines are primarily repaired at overhaul or component repair facilities, with only limited intervention conducted in the field. Processes used to repair compressor and turbine flowpath components include surface cleaning to remove accumulated dirt and oxidation products, stripping and restoration of coated surfaces, crack repair, section replacement, and aero contouring and smoothing. Repairing the components during planned service intervals reduces the cost to maintain the machines because the cost to repair components is sometimes less than the cost to replace the components. However, sometimes, the components run past their repair limits between planned service intervals. In addition, sometimes, heavily distressed components fail and cause an unplanned outage.

For at least some known machines, a tethered device, such as a borescope, is inserted through an opening of the machine and manipulated within a cavity of the machine for inspection. However, at least some known tethered devices do not access all locations of the machine. In particular, some non-rotating components in at least some known rotary machines are difficult to access with a tethered device. In addition, the angle of regard and distance between the inspection tool and the area of interest, combined with limited borescope orifice dimensions, sometimes precludes performance of maintenance operations even if trained borescope operators can gain visual access to areas of interest within the machine. As a result, damage detected during inspection is typically unmitigated until the machine is at least partially disassembled for service.

BRIEF DESCRIPTION

In one aspect, a system for use in maintaining a machine including a cavity is provided. The system includes a pilot apparatus including an insertion end and a steering end opposite the insertion end. The insertion end is positionable within the machine such that the pilot apparatus defines a path through the machine. The system also includes a steering interface configured to steer the insertion end relative to the machine. The system further includes a service apparatus for use in maintaining the machine. The service apparatus is configured to move along the path defined by the pilot apparatus.

In another aspect, a method of maintaining a machine including a cavity using a service apparatus is provided. The method includes positioning a pilot apparatus within the machine. The pilot apparatus includes an insertion end and a steering end opposite the insertion end. The method also includes directing the insertion end of the pilot apparatus through the machine using a steering interface configured to steer the insertion end relative to the machine. The method further includes positioning the insertion end such that the pilot apparatus defines a path through the cavity of the machine. The method also includes moving the service apparatus along the path defined by the pilot apparatus.

DRAWINGS

These and other features, aspects, and advantages of the present disclosure will become better understood when the following detailed description is read with reference to the accompanying drawings in which like characters represent like parts throughout the drawings, wherein.

Figure 1:
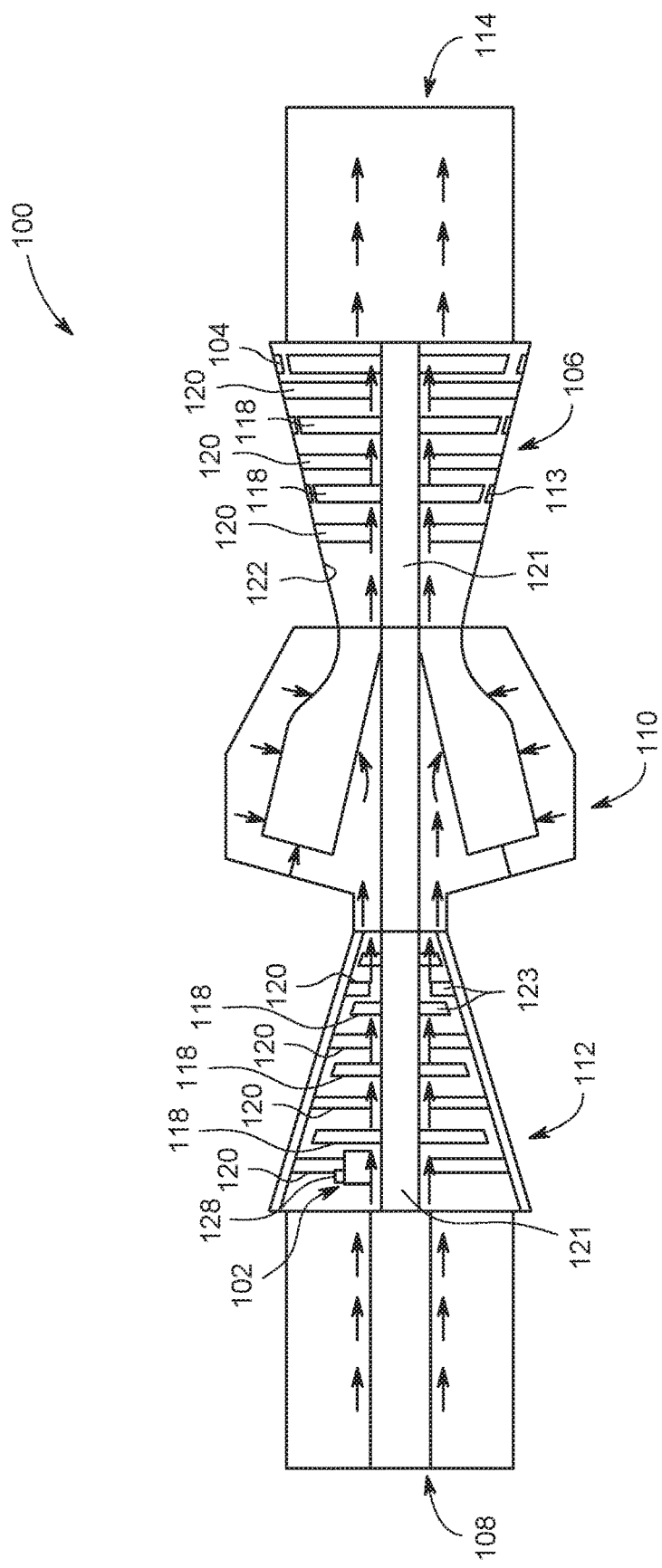
FIG. 1 is a cross-sectional schematic view of an exemplary machine and an exemplary service apparatus.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the exemplary embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein provide pilot apparatus for use in maintaining machines. The pilot apparatus defines a path through a cavity of the machine and facilitates positioning a service apparatus within the cavity. A steering interface allows an operator to direct the pilot apparatus as the pilot apparatus moves through the cavity. In some embodiments, a guide apparatus is used to guide the service apparatus along the path defined by the pilot apparatus. As a result, the pilot apparatus reduces the amount of effort and specialized training required to position the service apparatus within the cavity. Moreover, the pilot apparatus provides increased access to locations within the cavity of the machine and reduces the amount of time the machine is out of service for maintenance.

FIG. 1 is a cross-sectional schematic view of an exemplary machine and a service apparatus 102. In the exemplary embodiment, the machine is a rotary machine such as a turbine assembly. In alternative embodiments, the machine includes any assembly. For example, in some embodiments, the machine includes, without limitation, any of the following: a compressor, a blower, a pump, a turbine, a motor, and a generator.

In the exemplary embodiment, turbine assembly 100 includes an outer case 104, a turbine 106, an inlet 108, a combustor 110, a compressor 112, and an exhaust 114. Fluid flows from inlet 108, through compressor 112, through combustor 110, through turbine 106 and is discharged through exhaust 114. Together, outer case 104, blades 118, guide vanes 120, and shrouds 113 define a primary flowpath inside compressor 112 and turbine 106 of turbine assembly 100. This flowpath, combined with a flowpath through combustor 110, defines a primary cavity within turbine assembly 100. In alternative embodiments, turbine assembly 100 is configured in any manner that enables turbine assembly 100 to operate as described herein.

Also, in the exemplary embodiment, compressor 112 and turbine 106 include alternating stages of airfoils, including guide vanes 120 and blades 118. Guide vanes 120 are configured to direct fluid through turbine assembly 100 toward blades 118. Blades 118 are operably coupled with rotating shaft 121. Guide vanes 120 and shrouds 113 are stationary components and are coupled to an inner surface 122 of outer case 104. In alternative embodiments, compressor 112 and/or turbine 106 includes any airfoils that enable turbine assembly 100 to operate as described herein.

In addition, in the exemplary embodiment, service apparatus 102 is configured to move through the primary cavity of turbine assembly 100. Accordingly, service apparatus 102 facilitates maintenance of turbine assembly 100. For example, service apparatus 102 facilitates inspection and repair of turbine assembly 100 at locations within the primary cavity that are difficult to access from an exterior of turbine assembly 100 by known means, such as using a borescope tool. Moreover, service apparatus 102 includes a maintenance device 128 that is positionable to facilitate service apparatus 102 inspecting and/or repairing surfaces of turbine assembly 100.

During operation, service apparatus 102 is used to inspect and/or repair interior components of turbine assembly 100. For example, in some embodiments, service apparatus 102 is positioned adjacent a portion of interior surface 123 of turbine assembly 100. Interior surface 123 is any surface within the primary cavity of turbine assembly 100. For example, in some embodiments, interior surface 123 includes, without limitation, surfaces of blades 118, guide vanes 120, shrouds 113, and combustor 110. In some embodiments, service apparatus 102 detects a characteristic of interior surface 123. For example, in some embodiments, service apparatus 102 is used to generate an image of interior surface 123 and the image data is examined to determine the condition of interior surface 123 and, optionally, assess whether repairs are necessary. If repairs are necessary, service apparatus 102 can be used to repair interior surface 123. For example, in some embodiments, service apparatus 102 patches a damaged portion of interior surface 123.

While inside turbine assembly 100, service apparatus 102 may move through turbine assembly 100 to reach a desired location for inspection and/or repair. In some embodiments, rotating shaft 121 facilitates positioning service apparatus 102 circumferentially within the primary cavity of turbine assembly 100. For example, in some embodiments, service apparatus 102 is anchored to one or more blades 118 and is rotated to a desired circumferential position, such as adjacent to a guide vane 120 or inner shroud 113. In further embodiments, service apparatus 102 is anchored to stationary components of turbine assembly 100, such as to one or more guide vanes 120, and rotating shaft 121 is rotated to bring service apparatus 102 into proximity of a blade 118. In alternative embodiments, service apparatus 102 is positioned in any manner that enables service apparatus 102 to operate as described herein.

Figure 2:
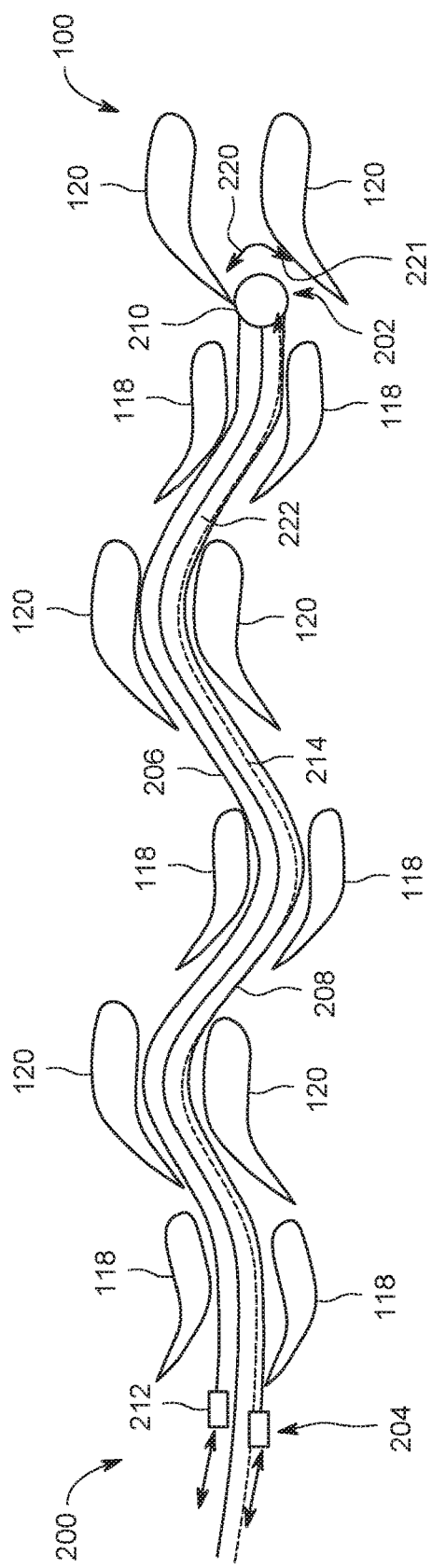
FIG. 2 is a schematic view of an exemplary pilot apparatus for use in maintaining the machine shown in FIG. 1.

FIG. 2 is a schematic view of a pilot apparatus 200 for use in maintaining turbine assembly 100. Pilot apparatus 200 includes an insertion end 202, a steering end 204, a first member 206, a second member 208, a head 210, and a steering interface 212. Insertion end 202 is configured for insertion into turbine assembly 100. For example, insertion end 202 is sized and shaped to fit and move within the primary cavity of turbine assembly 100, including between components such as blades 118 and guide vanes 120 of turbine assembly 100. First member 206 and second member 208 extend from insertion end 202 to steering end 204 and are configured to define a path 214 through turbine assembly 100 when insertion end 202 is positioned within turbine assembly 100.

In the exemplary embodiment, head 210 is coupled to first member 206 and second member 208 at insertion end 202. In some embodiments, head 210 includes at least one sensor. Accordingly, head 210 is configured to detect characteristics of turbine assembly 100. For example, in some embodiments, head 210 includes a camera for generating images of turbine assembly 100. In alternative embodiments, pilot apparatus 200 includes any head 210 that enables pilot apparatus 200 to operate as described herein.

Also, in the exemplary embodiment, steering interface 212 is coupled to first member 206 and second member 208 at steering end 204. Steering interface 212 is configured to steer insertion end 202 relative to turbine assembly 100 as insertion end 202 is moved through turbine assembly 100. For example, steering interface 212 allows an operator to turn insertion end 202 in directions 220, 221 and, thereby, steer insertion end 202 between components of turbine assembly 100, such as between alternating rows of blades 118 and guide vanes 120. In the exemplary embodiment, steering interface 212 includes handles coupled to first member 206 and second member 208. For example, during operation, an operator may apply a forward force to a handle of steering interface 212 coupled to first member 206 (relative to second member 208) to move insertion end 202 in direction 221. An operator may apply a forward force to a handle of steering interface 212 coupled to second member 208 (relative to first member 206) to move insertion end 202 in direction 220. In some embodiments, first member 206 and second member 208 are flexible and bend elastically in a plane extending along path 214 while enabling an operator to direct pilot apparatus 200 using steering interface 212. At the same time, first member 206 and second member 208 are relatively rigid in the plane of the sheets to allow transmission of the steering forces while preventing pilot apparatus 200 from elastically bending in directions perpendicular to directions 220, 221. For example, in some embodiments, first member 206 and second member 208 comprise elastically deformable sheets, such as fiberglass, spring steel, or any material that allows the first member 206 and second member 208 to elastically bend in directions 220, 221 while providing sufficient stiffness to allow forward forces on the steering interface 212 to advance the insertion end 202 along path 214. In alternative embodiments, pilot apparatus 200 includes any member that enables pilot apparatus 200 to operate as described herein. For example, in some embodiments, pilot apparatus 200 includes a channel sized and shaped for at least one of guide apparatus 305 (shown in FIG. 4) and service apparatus 102 to move through. In further embodiments, first member 206 and/or second member 208 is flexible in two or more directions. In alternative embodiments, pilot apparatus 200 includes any steering interface 212 that enables pilot apparatus 200 to operate as described herein. For example, in some embodiments, steering interface 212 includes a joystick, keyboard, touchscreen, and/or any other suitable interface.

In the exemplary embodiment, insertion end 202 of pilot apparatus 200 is steered based on elastic deflection of a portion of first member 206 and second member 208 proximate head 210 of the insertion end 202 of pilot apparatus 200. In alternative embodiments, pilot apparatus 200 is steered in any manner that enables pilot apparatus 200 to function as described herein. For example, in some embodiments, pilot apparatus 200 is steered using rotary joints, prismatic joints, discrete joints, and/or continuous joints. In further embodiments, pilot apparatus 200 is driven by serial and/or parallel actuation.

In addition, in the exemplary embodiment, a cord 222 extends from head 210 to steering end 204. Cord 222 provides power and communications to at least one sensor on head 210. For example, in some embodiments, cord 222 provides power from a power source to a camera on head 210 and carries data signals between head 210 and steering end 204. In alternative embodiments, pilot apparatus 200 receives power and/or communicates in any manner that enables pilot apparatus 200 to operate as described herein. For example, in some embodiments, cord 222 is omitted and pilot apparatus 200 is configured to operate using battery power and wireless communications.

In some embodiments, pilot apparatus 200 includes one or more lights configured to illuminate a portion of the cavity of turbine assembly 100. In some embodiments, the lights enable sensors to detect characteristics of turbine assembly 100, such as to aid navigation of the insertion end 202 of pilot apparatus 200.

In reference to FIGS. 1 and 2, during operation, pilot apparatus 200 is positioned within turbine assembly 100 using any suitable access port or opening of turbine assembly 100. For example, in some embodiments, pilot apparatus 200 is inserted into turbine assembly 100 through any of inlet 108, exhaust 114, and/or an access port, such as an igniter, borescope, combustion or fuel nozzle port. In the exemplary embodiment, pilot apparatus 200 is sized and shaped to fit within turbine assembly 100 (shown in FIG. 1) and to extend through turbine assembly 100, such as through the primary cavity of turbine assembly 100, to a region requiring inspection and/or repair. In some embodiments, a region within turbine assembly 100 requiring repair includes, without limitation, any of the following deterioration: cracks, coating loss, surface foulant accumulation, and/or worn surfaces. For example, in some embodiments, repair material is applied onto the interior surface of turbine assembly 100 in order to repair such distressed region. Accordingly, pilot apparatus 200 is used to position service apparatus 102 in the vicinity of the region requiring inspection and/or repair. After inspection and/or repair of interior surface 123, service apparatus 102 is removed from turbine assembly 100 through any suitable access port or opening of turbine assembly 100. In some embodiments, pilot apparatus 200 is used to remove service apparatus 102. In further embodiments, service apparatus 102 is removed using an apparatus that is distinct from pilot apparatus 200 used to deploy service apparatus 102.

Figure 3:
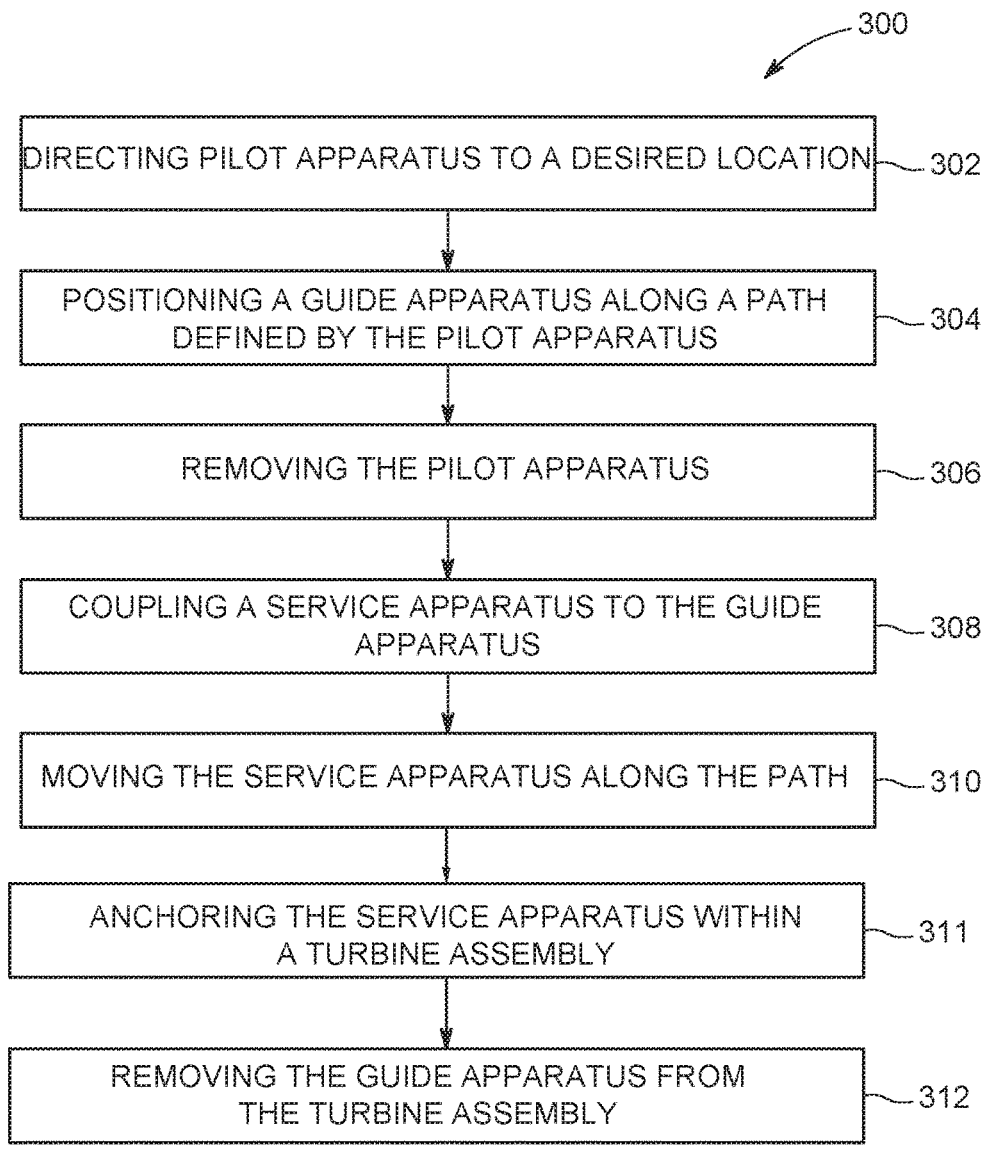
FIG. 3 is a flow chart of an exemplary method of positioning a service apparatus within the machine shown in FIG. 1 using the pilot apparatus shown in FIG. 2.
Figure 4:
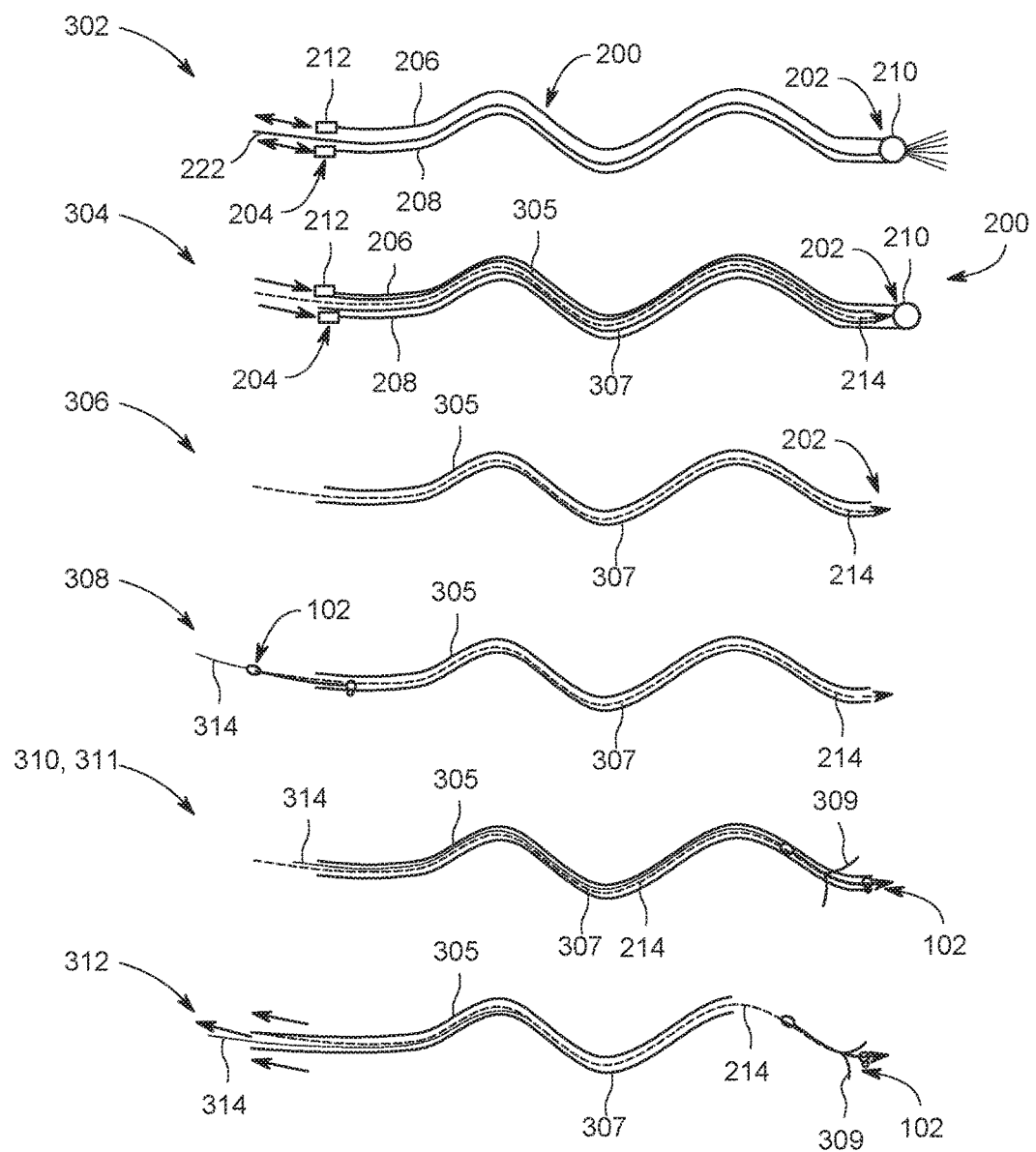
FIG. 4 is a series of schematic views of positioning the service apparatus within the machine shown in FIG. 1 using the pilot apparatus shown in FIG. 2.

FIG. 3 is a flow chart of an exemplary method 300 of positioning service apparatus 102 (shown in FIG. 1) within turbine assembly 100 (shown in FIG. 1) using pilot apparatus 200 (shown in FIG. 2). FIG. 4 is a series of exemplary schematic views of positioning service apparatus 102 within turbine assembly 100 (shown in FIG. 1) using pilot apparatus 200. Method 300 includes directing 302 pilot apparatus 200 to a desired location, positioning 304 a guide apparatus 305 along path 214 defined by pilot apparatus 200, removing 306 pilot apparatus 200 from turbine assembly 100, coupling 308 service apparatus 102 to guide apparatus 305, moving 310 service apparatus 102 along path 214, anchoring 311 service apparatus within turbine assembly 100, and removing 312 guide apparatus 305 from turbine assembly 100.

In the exemplary embodiment, insertion end 202 of pilot apparatus 200 is directed 302 to a desired location using steering interface 212. In particular, an operator manipulates steering interface 212 to direct 302 insertion end 202 around obstacles in the path of pilot apparatus 200 and position pilot apparatus 200 at the desired location.

In addition, in the exemplary embodiment, guide apparatus 305 is positioned 304 along path 214. In the exemplary embodiment, guide apparatus 305 is positioned between first member 206 and second member 208 of pilot apparatus 200 such that pilot apparatus 200 directs guide apparatus 305 along path 214. Guide apparatus 305 is configured to extend from insertion end 202 to steering end 204 of pilot apparatus 200. Accordingly, guide apparatus 305 extends along path 214 when guide apparatus 305 is positioned in pilot apparatus 200. In some embodiments, guide apparatus 305 is positioned 304 along path 214 after pilot apparatus 200 is directed 302 to the location. In further embodiments, guide apparatus 305 and pilot apparatus 200 are directed 302 to the desired location along path 214 together, such that steps 302 and 304 are combined into a single operation.

Also, in the exemplary embodiment, pilot apparatus 200 is removed by applying forces to steering interface 212 and directing pilot apparatus 200 in the reverse direction along path 214. Guide apparatus 305 is maintained in position along path 214 when pilot apparatus 200 is removed. In alternative embodiments, pilot apparatus 200 is removed at any time that enables pilot apparatus 200 to function as described herein. For example, in some embodiments, pilot apparatus 200 remains in position during movement 310 of service apparatus 102 and service apparatus 102 is moved 310 along guide apparatus 305 within pilot apparatus 200. In further embodiments, a distinct guide apparatus 305 is omitted and service apparatus 102 is moved directly along pilot apparatus 200.

In addition, in the exemplary embodiment, service apparatus 102 is coupled 308 to guide apparatus 305 and is moved 310 along path 214 using guide apparatus 305. In some embodiments, guide apparatus 305 includes a track, broadly a guide member, 307 and service apparatus 102 is movably coupled to track 307. In the exemplary embodiment, guide apparatus 305 enables service apparatus 102 to move along path 214 toward a desired location of turbine assembly 100 (shown in FIG. 1) requiring inspection and/or repair. Also, in the exemplary embodiment, guide apparatus 305 is removed 312 when service apparatus 102 is at a desired location and has been mechanically anchored 311 to turbine assembly 100 using anchor 309. In alternative embodiments, service apparatus 102 and guide apparatus 305 have any configuration that enable operation as described herein.

Moreover, in the exemplary embodiment, a tether 314 extends from service apparatus 102 and is configured to provide power and/or communications for service apparatus 102 during deployment. In addition, in some embodiments, tether 314 provides a means of retrieving service apparatus 102 in case of mechanical, electrical, and/or communications failure during deployment. In further embodiments, service apparatus 102 is powered and/or controlled wirelessly during deployment and tether 314 is only used for emergency retrieval. In still further embodiments, tether 314 is not used and other means of emergency retrieval are employed.

Figure 5:
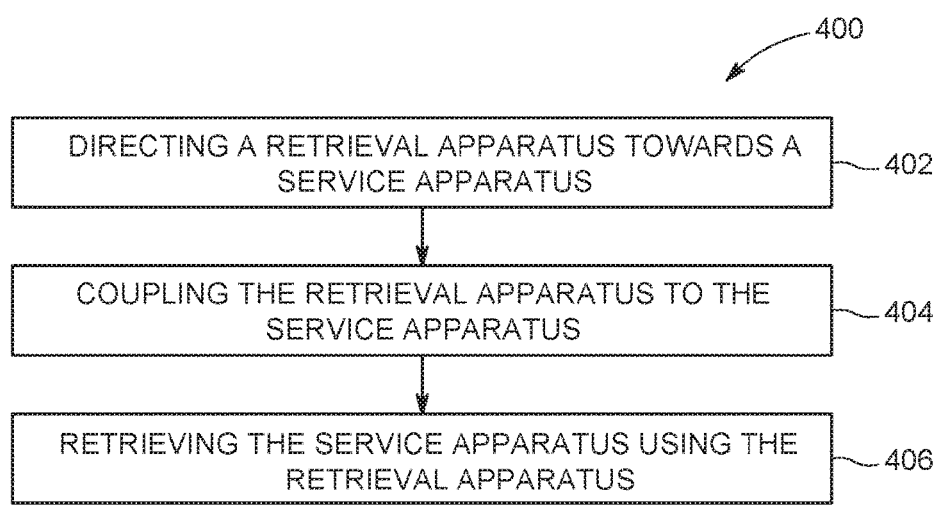
FIG. 5 is a flow chart of an exemplary method of retrieving the service apparatus from the machine shown in FIG. 1 using a retrieval apparatus.
Figure 6:
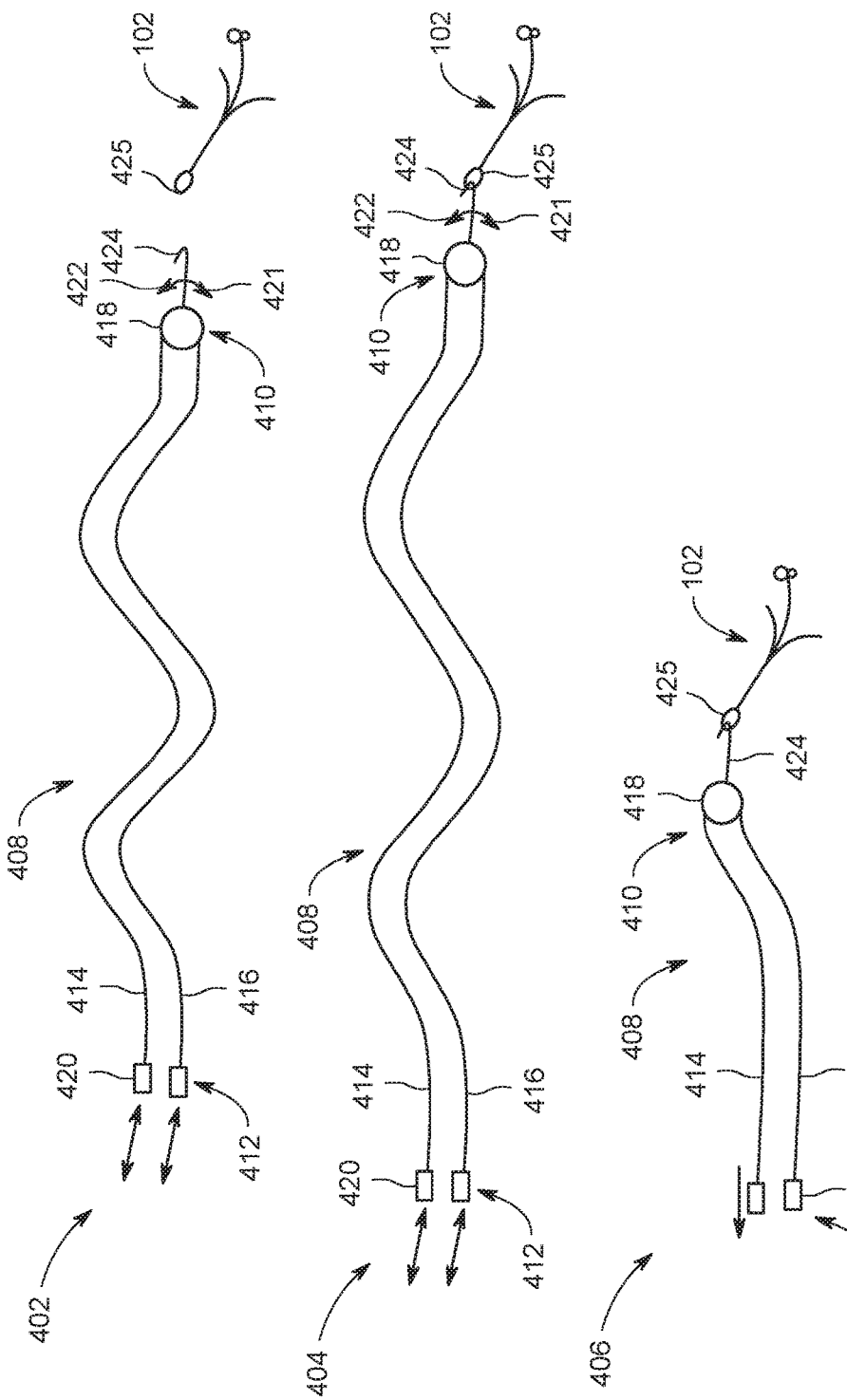
FIG. 6 is a series of schematic views of retrieval of the service apparatus from the machine shown in FIG. 1 using a retrieval apparatus.

FIG. 5 is a flow chart of an exemplary method 400 of retrieving service apparatus 102 (shown in FIG. 1) from turbine assembly 100 (shown in FIG. 1) using a retrieval apparatus 408. FIG. 6 is a series of schematic views of retrieval of service apparatus 102 from turbine assembly 100 (shown in FIG. 1) using retrieval apparatus 408. In the exemplary embodiment, method 400 includes directing 402 retrieval apparatus 408 towards service apparatus 102, coupling 404 retrieval apparatus 408 to service apparatus 102, and retrieving 406 service apparatus 102 using retrieval apparatus 408.

In the exemplary embodiment, retrieval apparatus 408 includes an insertion end 410, a steering end 412, a first member 414, a second member 416, a head 418, and a steering interface 420. In some embodiments, pilot apparatus 200 (shown in FIG. 2) is used as retrieval apparatus 408. In alternative embodiments, service apparatus 102 is retrieved using any retrieval apparatus 408 that enables service apparatus 102 to operate as described herein.

In the exemplary embodiment, retrieval apparatus 408 is directed 402 towards service apparatus 102 using steering interface 420. When retrieval apparatus 408 is adjacent service apparatus 102, retrieval apparatus 408 is coupled 404 to service apparatus 102. In the exemplary embodiment, head 418 of retrieval apparatus 408 includes an engagement feature 424 such as a hook to facilitate coupling retrieval apparatus 408 to service apparatus 102. To couple retrieval apparatus 408 and service apparatus 102, an operator can use steering interface 420 to move insertion end 410 in directions 421, 422 to engage engagement feature 424, such as a hook, with an extraction feature 425, such as a loop, on service apparatus 102. In alternative embodiments, retrieval apparatus 408 and service apparatus 102 are coupled in any manner. For example, in some embodiments, there are additional degrees of freedom to position and secure the engagement feature 424 on the extraction feature 425 of service apparatus 102 to facilitate coupling retrieval apparatus 408 and service apparatus 102. For example, engagement feature 424 may have additional steering and grasping controls that are actuated via steering interface 420 on steering end 412 of retrieval apparatus 408. In further embodiments, retrieval apparatus 408 and service apparatus 102 are coupled using mechanical engagement (e.g., screw, latch, vise), chemical adhesion (e.g., adhesive tape, epoxy, glue), electrostatic coupling, and/or magnetic coupling.

Also, in the exemplary embodiment, after retrieval apparatus 408 is coupled 404 to service apparatus 102, service apparatus 102 is retrieved 406 using retrieval apparatus 408. To remove retrieval apparatus 408 and service apparatus 102, an operator applies a force to steering interface 420 to extract retrieval apparatus 408 and service apparatus 102 in the reverse direction along path 214 (shown in FIG. 4). In alternative embodiments, retrieval apparatus 408 and/or service apparatus 102 are removed from the primary cavity of turbine assembly 100 in any suitable manner. For example, in some embodiments, retrieval apparatus 408 includes a guide member and service apparatus 102 is removed by moving service apparatus 102 along the guide member.

For example, in some embodiments, retrieval apparatus 408 includes a camera for generating images of turbine assembly 100. In addition, in some embodiments, retrieval apparatus 408 includes one or more lights configured to illuminate a portion of the cavity of turbine assembly 100. The lights enable sensors to detect characteristics of turbine assembly 100, such as to aid navigation of retrieval apparatus 408. Moreover, in some embodiments, a tether extends from retrieval apparatus 408 and is configured to provide power and/or communications for retrieval apparatus 408 during deployment. In further embodiments, service apparatus 102 is powered and/or controlled wirelessly during deployment.

Figure 7:
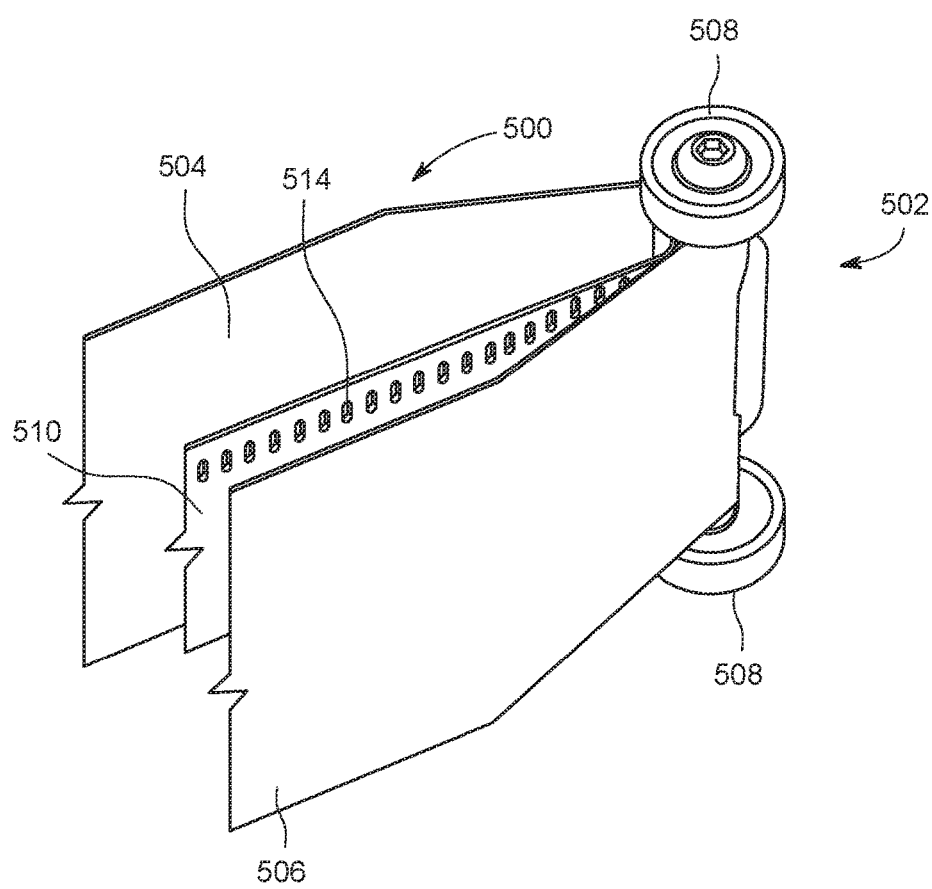
FIG. 7 is a perspective view of a portion of another exemplary embodiment of a pilot apparatus for use in maintaining the machine shown in FIG. 1.
Figure 8:
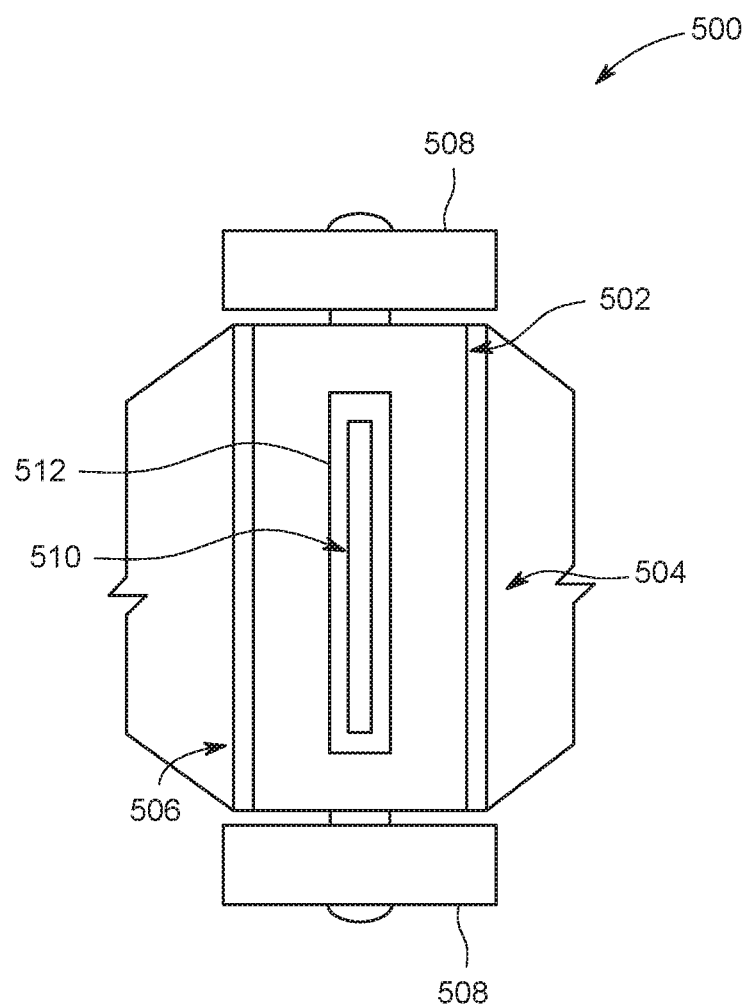
FIG. 8 is an end view of the pilot apparatus shown in FIG. 7.

FIG. 7 is a perspective view of a portion of another exemplary embodiment of a pilot apparatus 500 and a guide apparatus 510 for use in maintaining turbine assembly 100 (shown in FIG. 1). FIG. 8 is an end view of pilot apparatus 500 and guide apparatus 510. Pilot apparatus 500 includes an insertion end 502, a first member 504, and a second member 506. First member 504 and second member 506 are coupled together at insertion end 502. In this illustrative example, guide apparatus 510 extends between first member 504 and second member 506 and is removably coupled to insertion end 502. In particular, guide apparatus 510 extends through an opening 512 in insertion end 502. In alternative embodiments, pilot apparatus 500 and guide apparatus 510 are coupled together in any manner that enables pilot apparatus 500 to operate as described herein.

During operation, pilot apparatus 500 and guide apparatus 510 are inserted into turbine assembly 100 (shown in FIG. 1), either as an assembly or in sequence. Pilot apparatus 500 thus positions insertion end 502 of guide apparatus 510 at a desired location in turbine assembly 100, using a steering interface to steer insertion end 502. In some embodiments, bumpers or wheels 508 facilitate pilot apparatus 500 moving through turbine assembly 100. Pilot apparatus 500 and guide apparatus 510 are sized and shaped such that pilot apparatus 500 may be decoupled from guide apparatus 510 and removed while guide apparatus 510 remains in position. For example, opening 512 of pilot apparatus 500 has a width greater than a thickness of guide apparatus 510, and a height greater than a height of guide apparatus 510. Accordingly, opening 512 allows pilot apparatus 500 to move relative to guide apparatus 510 when guide apparatus 510 is received in opening 512. When insertion end 502 of pilot apparatus 500 reaches a desired region of turbine assembly 100 (shown in FIG. 1), pilot apparatus 500 is removed and guide apparatus 510 is used to guide service apparatus 102 (shown in FIG. 1) into position within turbine assembly 100. In the exemplary embodiment, guide apparatus 510 includes a guide member or track 514 and service apparatus 102 (shown in FIG. 1) is moved along guide member or track 514.

Figure 9:
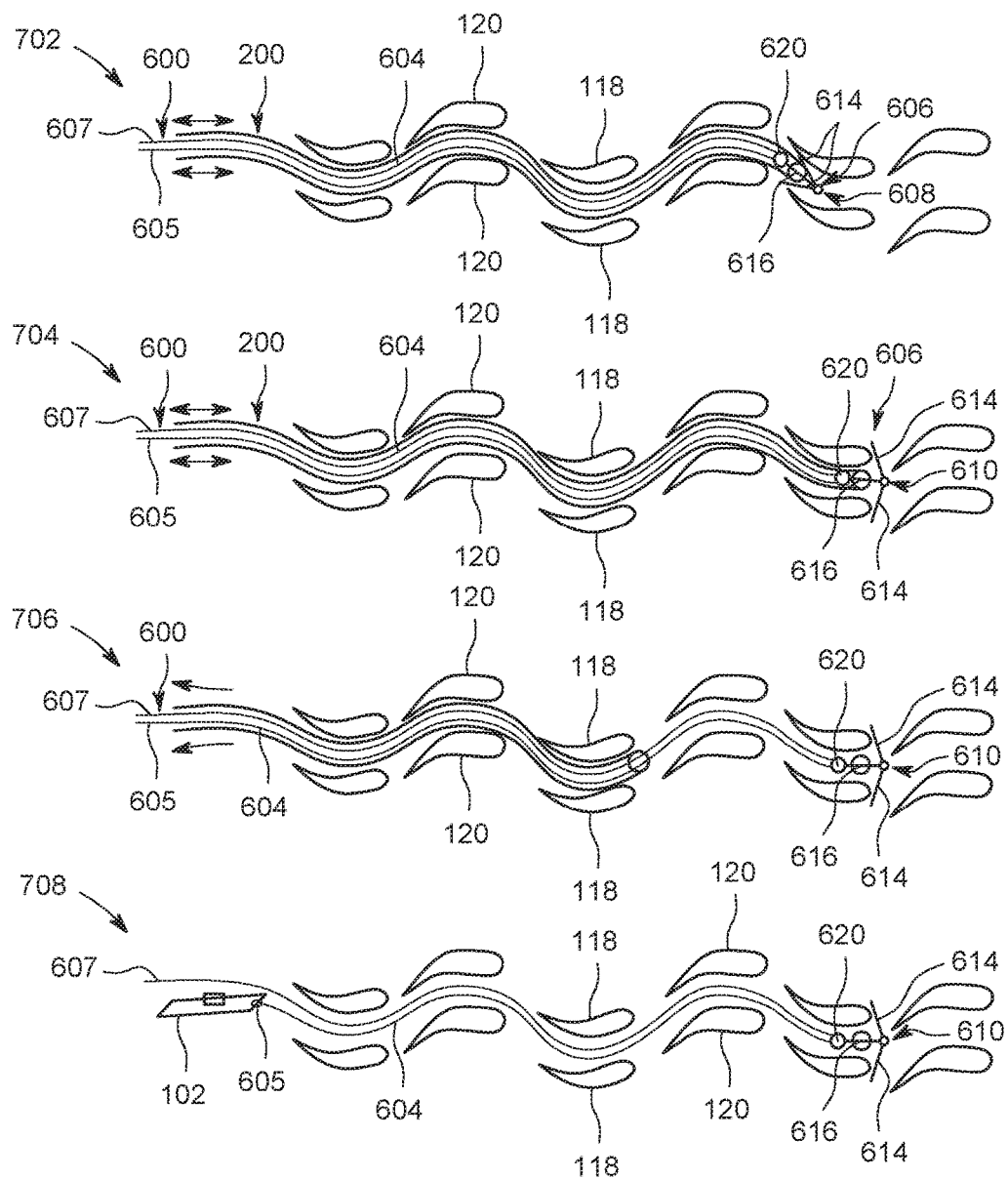
FIG. 9 is a series of schematic views of positioning a guide apparatus within the machine shown in FIG. 1 using the pilot apparatus shown in FIG. 2.
Figure 10:
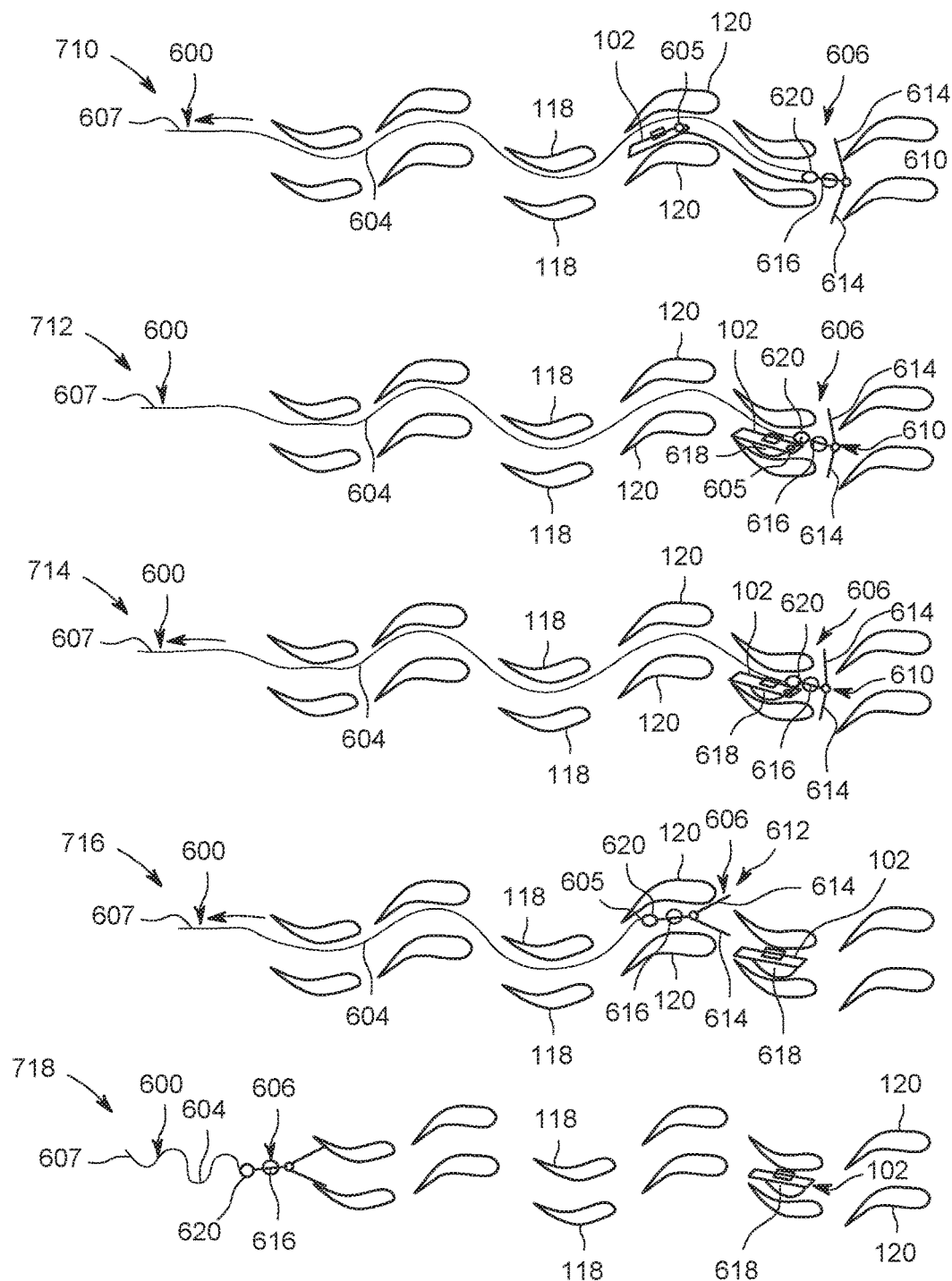
FIG. 10 is a series of schematic views of positioning a service apparatus within the machine shown in FIG. 1 using the guide apparatus shown in FIG. 9.

FIG. 9 is a series of schematic views of an alternative embodiment of positioning a guide apparatus 600 within turbine assembly 100 using pilot apparatus 200. FIG. 10 is a series of schematic views of positioning a service apparatus 102 within turbine assembly 100 using said guide apparatus 600. Guide apparatus 600 is configured to extend through a primary cavity of turbine assembly 100 and direct service apparatus 102 through the primary cavity. In the exemplary embodiment, guide apparatus 600 is positioned within the primary cavity of turbine assembly 100 using pilot apparatus 200. In alternative embodiments, guide apparatus 600 is positioned in any manner that enables guide apparatus 600 to function as described herein.

Also, in the exemplary embodiment, guide apparatus 600 includes a cable 604, broadly a guide member, configured to couple to service apparatus 102 and allow service apparatus 102 to be directed into position within turbine assembly 100. Cable 604 is configured to form a loop within the primary cavity of turbine assembly 100. Cable 604 includes a first end 605 and a second end 607. First end 605 is configured to couple to service apparatus 102. Second end 607 is configured to extend outside of the primary cavity and allow an operator to direct service apparatus 102 connected to first end 605 by pulling on second end 607. In alternative embodiments, guide apparatus 600 includes any cable 604 that enables guide apparatus 600 to operate as described herein. For example, in some embodiments, guide apparatus 600 includes two or more cables 604.

In addition, in the exemplary embodiment, guide apparatus 600 is configured to couple to a component, such as blades 118 and guide vanes 120 of turbine assembly 100, using an anchor mechanism 606 coupled to a head 616 of guide apparatus 600. Anchor mechanism 606 is positionable between a first position 608, a second position 610, and a third position 612. When anchor mechanism 606 is in first position 608, anchor features 614 of anchor mechanism 606 are retracted and positioned along head 616 of guide apparatus 600. When anchor mechanism 606 is in second position 610, anchor features 614 are extended and configured to engage components such as blades 118 and guide vanes 120 of turbine assembly 100. When anchor mechanism 606 is in third position 612, anchor features 614 are disengaged from components such as blades 118 and guide vanes 120 of turbine assembly 100. Accordingly, first position 608 and third position 612 facilitate guide apparatus 600 moving within the primary cavity of turbine assembly 100. Second position 610 facilitates head 616 of guide apparatus 600 maintaining a position relative to turbine assembly 100. In particular, in the exemplary embodiment, when anchor mechanism 606 is in the second position, anchor features 614 extend outward from head 616 and form a width greater than a gap between adjacent blades 118 or guide vanes 120. In alternative embodiments, guide apparatus 600 includes any anchor mechanism 606 that enables guide apparatus 600 to operate as described herein.

Also, in the exemplary embodiment, guide apparatus 600 includes a pulley mechanism 620. Pulley mechanism 620 is coupled to head 616 and cable 604 and allows movement of cable 604 relative to head 616. Pulley mechanism 620 facilitates a user pulling on second end 607 and directing service apparatus 102 through the primary cavity of turbine assembly 100 along the path defined by the pilot apparatus 200. In some embodiments, pulley mechanism 620 is omitted.

Moreover, in the exemplary embodiment, service apparatus 102 includes an anchor mechanism 618 configured to maintain service apparatus 102 in position between adjacent blades 118 or guide vanes 120 within the primary cavity of turbine assembly 100. For example, anchor mechanism 618 is configured to couple to blades 118 or guide vanes 120 when service apparatus 102 is at a desired location. In alternative embodiments, service apparatus 102 is positioned in any manner that enables service apparatus 102 to operate as described herein.

During operation, guide apparatus 600 is directed 702 to a desired location using pilot apparatus 200. At the desired location, guide apparatus 600 is coupled 704 to components such as blades 118 or vanes 120 using anchor mechanism 606 by transitioning anchor mechanism 606 from first position 608 to second position 610. Pilot apparatus 200 is removed 706 while guide apparatus 600 remains at the desired location. Service apparatus 102 is coupled 708 to first end 605 of cable 604 and an operator directs 710 service apparatus 102 along the specified path through turbine assembly 100 to a desired location by applying a rearward force (i.e., pulling) on second end 607 of cable 604. Service apparatus 102 is anchored 712 to components, such as blades 118 or guide vanes 120 of turbine assembly 100 at the desired location using anchor mechanism 618. Service apparatus 102 is released 714 from guide apparatus 600 and anchor mechanism 606 is transitioned 716 from second position 610 to third position 612 to allow guide apparatus 600 to be removed. Guide apparatus 600 is removed 718 from turbine assembly 100 by pulling second end 607 of cable 604 while service apparatus 102 remains in position.

Figure 11:
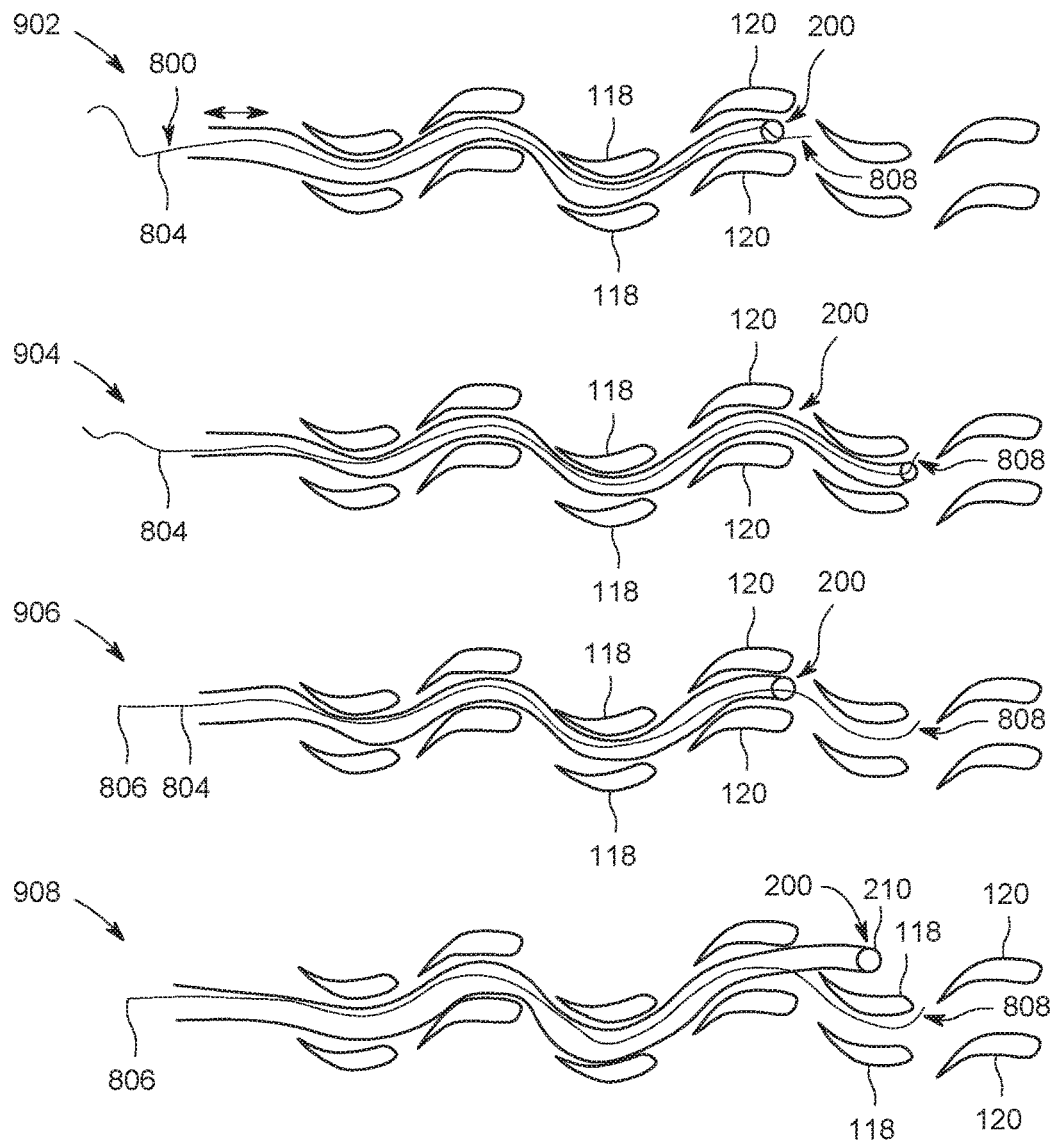
FIG. 11 is a series of schematic views of positioning a guide apparatus within the machine shown in FIG. 1 using the pilot apparatus shown in FIG. 2.
Figure 12:
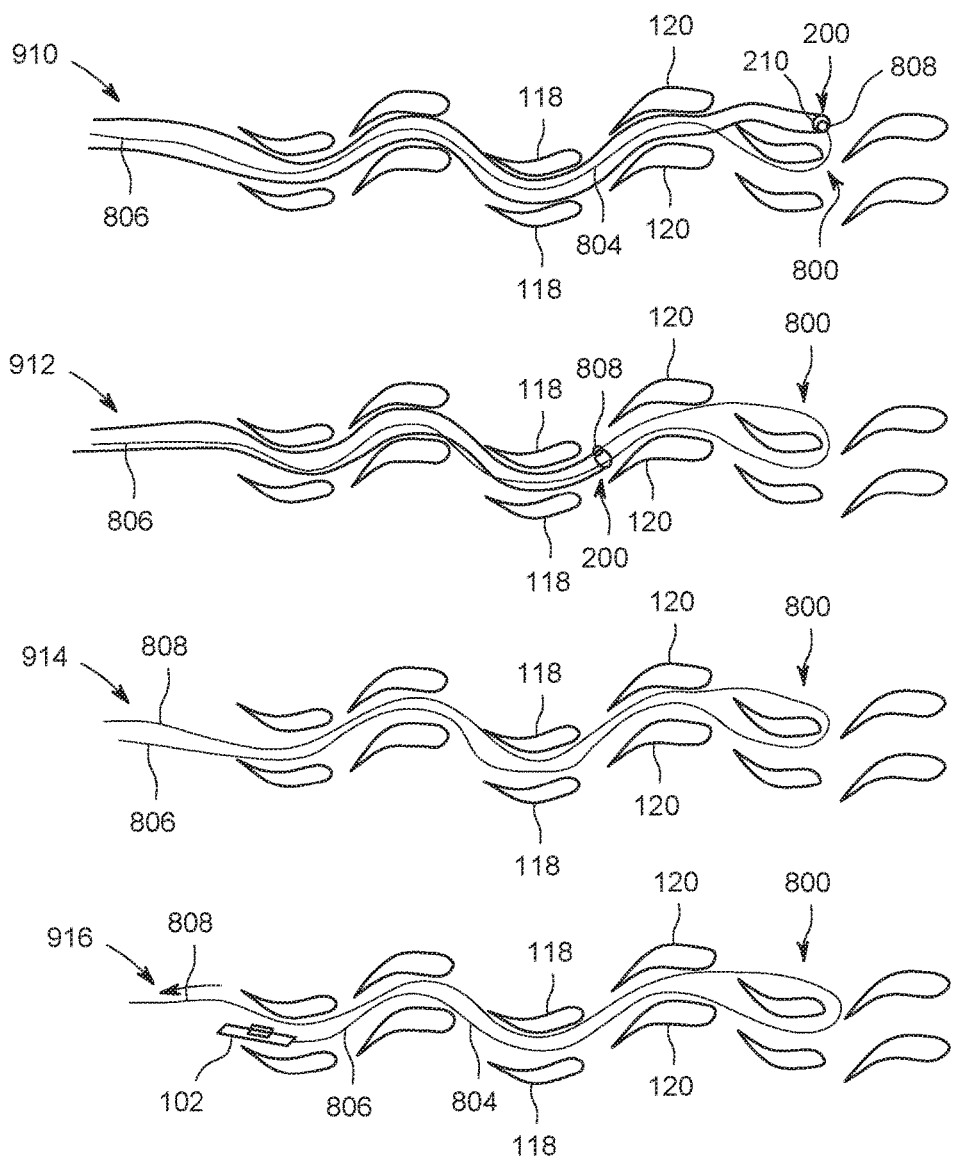
FIG. 12 is a series of schematic views of positioning the guide apparatus shown in FIG. 11 within the machine shown in FIG. 1 and positioning a service apparatus within the machine using the guide apparatus.

FIG. 11 is a series of schematic views of an alternative embodiment of positioning a guide apparatus 800 within turbine assembly 100 using pilot apparatus 200. FIG. 12 is a series of schematic views of positioning guide apparatus 800 within turbine assembly 100 and positioning a service apparatus 102 within turbine assembly 100 using guide apparatus 800. Guide apparatus 800 is similar to guide apparatus 600 (shown in FIGS. 9 and 10) except guide apparatus 800 does not include anchor mechanism 606. Guide apparatus 800 includes a cable 804 configured to form a loop within the primary cavity of turbine assembly 100. In the exemplary embodiment, cable 804 wraps about at least one of blades 118 or guide vanes 120. In alternative embodiments, guide apparatus 800 has any configuration that enables guide apparatus 800 to operate as described herein.

During operation, guide apparatus 800 is directed 902 through the primary cavity using pilot apparatus 200. Second end 808 of guide apparatus 800 is deposited 904 at a desired stage of blades 118 or guide vanes 120. Pilot apparatus 200 is then partially retracted 906, e.g., moved to a previous stage of blades or guide vanes 120. Pilot apparatus 200 is then directed 908 axially along a circumferentially adjacent blade 118 or guide vane 120, until head 210 of pilot apparatus 200 is in proximity to second end 808 of guide apparatus 800. Pilot apparatus 200 is coupled 910 to second end 808 of guide apparatus 800 and withdrawn 912 from turbine assembly 100 while directing second end 808 of guide apparatus 800 around the opposite side of the blade 118 or guide vane 120. Accordingly, guide apparatus 800 forms 914 a loop within the primary cavity of turbine assembly 100. A first end 806 of cable 804 is coupled to service apparatus 102 and service apparatus 102 is directed 916 along the path defined by the pilot apparatus 200 through the primary cavity of turbine assembly 100 by applying a rearward force to (i.e., pulling) a second end 808 of cable 804.

An exemplary technical effect of the methods, systems, and apparatus described herein includes at least one of: (a) reducing the time to inspect and/or repair machines; (b) increasing the accessibility of difficult-to-reach locations within a turbine assembly for inspection and/or in situ repair; (c) reducing the time that machines are out of service for maintenance; and (d) reducing training required to operate service apparatus.

Exemplary embodiments of methods, systems, and apparatus for use in maintaining machines are not limited to the specific embodiments described herein, but rather, components of systems and/or steps of the methods may be utilized independently and separately from other components and/or steps described herein. For example, the methods, systems, and apparatus may also be used in combination with other systems requiring inspection and/or repair of components, and are not limited to practice with only the systems and methods as described herein. Rather, the exemplary embodiment can be implemented and utilized in connection with many other applications, equipment, and systems that may benefit from using a service apparatus for inspection and/or repair.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system for use in maintaining a machine including a cavity, said system comprising:
a pilot apparatus including an insertion end and a steering end opposite said insertion end, wherein said insertion end is positionable within the machine such that said pilot apparatus defines a path through the machine;

a steering interface configured to steer said insertion end relative to the machine;

a service apparatus for use in maintaining the machine, wherein said service apparatus is configured to move along the path defined by said pilot apparatus; and a guide apparatus configured to extend along the path defined by said pilot apparatus, said guide apparatus is configured to guide said service apparatus along the path.

2. The system in accordance with claim 1, wherein said guide apparatus comprises a cable configured to couple to said service apparatus and allow said service apparatus to be pulled into position within the machine.

3. The system in accordance with claim 1, wherein said guide apparatus is coupled to said pilot apparatus such that said pilot apparatus and said guide apparatus are inserted into the machine as an assembly.

4. The system in accordance with claim 1, wherein said guide apparatus includes a guide member, and wherein said service apparatus is movably coupled to said guide member.

5. The system in accordance with claim 4, wherein said guide member comprises a track and said service apparatus propels itself along said track into position within the machine.

6. The system in accordance with claim 1, wherein said pilot apparatus includes a head, a first elastic sheet, and a second elastic sheet, and wherein said first elastic sheet and said second elastic sheet extend from said steering end to said insertion end, and wherein said head is coupled to said first elastic sheet and said second elastic sheet at said insertion end.

7. The system in accordance with claim 6, wherein said first sheet and said second sheet are relatively compliant to bend within a plane and relatively rigid in bending outside of the plane.

8. The system in accordance with claim 6, wherein said steering interface is coupled to said first sheet and said second sheet at said steering end.

9. The system in accordance with claim 1, wherein said pilot apparatus includes a sensor at said insertion end configured to detect a characteristic of the machine.

10. The system in accordance with claim 1, wherein said pilot apparatus includes an engagement feature to facilitate retrieval of said service apparatus from the machine.

11. The system in accordance with claim 1, wherein said service apparatus is configured to operate within the cavity of a turbine assembly, and wherein said service apparatus is positionable relative to the turbine assembly.

12. The system in accordance with claim 11, wherein said service apparatus is configured to anchor to the turbine assembly to facilitate positioning said service apparatus adjacent a portion of the turbine assembly using a rotating component of the turbine assembly.

13. A method of maintaining a machine including a cavity using a service apparatus, said method comprising:

positioning a pilot apparatus within the machine, the pilot apparatus including an insertion end and a steering end opposite the insertion end;

directing the insertion end of the pilot apparatus through the machine using a steering interface configured to steer the insertion end relative to the machine;

positioning the insertion end such that the pilot apparatus defines a path through the machine;

positioning a guide apparatus along the path defined by the pilot apparatus; and moving the service apparatus along the path defined by the pilot apparatus, wherein the guide apparatus is configured to guide the service apparatus along the path.

14. The method in accordance with claim 13 further comprising movably coupling the service apparatus to the guide apparatus.

15. The method in accordance with claim 13 further comprising coupling the guide apparatus to the pilot apparatus such that the pilot apparatus and the guide apparatus are inserted into the machine as an assembly.

16. The method in accordance with claim 13 wherein the guide apparatus includes a cable having a first end and a second end, the first end of the cable configured to couple to the service apparatus, and wherein moving the service apparatus along the path defined by the pilot apparatus comprises pulling the second end of the cable to direct the first end and the service apparatus along the path defined by the pilot apparatus.

17. The method in accordance with claim 13 further comprising removing the pilot apparatus from the machine when the service apparatus is positioned in the machine.

18. The method in accordance with claim 13 further comprising removing the guide apparatus from the machine prior to removing the pilot apparatus.

19. The method in accordance with claim 13 further comprising retrieving the service apparatus from the machine using a retrieval apparatus.

20. The method in accordance with claim 13, wherein directing the insertion end of the pilot apparatus through the machine using a steering interface configured to steer the insertion end relative to the machine comprises applying a force to the steering interface to position a flexible member of the pilot apparatus, wherein the flexible member extends from the steering end to the insertion end and is coupled to the steering interface at the steering end.

* * * * *